United States Patent
Wang et al.

(10) Patent No.: US 10,227,160 B2
(45) Date of Patent: Mar. 12, 2019

(54) POLYSILAZANE-DERIVED COATING FOR GLASS CONTAINERS

(71) Applicant: Owens-Brockway Glass Container Inc., Perrysburg, OH (US)

(72) Inventors: Zhongming Wang, Ypsilanti, MI (US); Carol A Click, Corning, NY (US); Michael P Remington, Toledo, OH (US); Pramod K Sharma, Ann Arbor, MI (US); Edward A Ordway, Toledo, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 1260 days.

(21) Appl. No.: 14/017,357

(22) Filed: Sep. 4, 2013

(65) Prior Publication Data

US 2015/0060444 A1  Mar. 5, 2015

(51) Int. Cl.
*B65D 1/02* (2006.01)
*B65D 23/08* (2006.01)
(Continued)

(52) U.S. Cl.
CPC ........ *B65D 23/0814* (2013.01); *C03C 17/005* (2013.01); *C03C 17/22* (2013.01); *C03C 17/25* (2013.01); *C03C 17/27* (2013.01)

(58) Field of Classification Search
CPC .... B65D 1/0215; B65D 1/0207; B65D 23/08; B65D 23/081; B65D 23/0814;
(Continued)

(56) References Cited

U.S. PATENT DOCUMENTS 5,162,136 A * 11/1992 Blum ............... C03C 17/22
427/126.2
6,083,313 A * 7/2000 Venkatraman ........... C08J 7/047
106/287.14
(Continued)

FOREIGN PATENT DOCUMENTS

JP    H11322367    11/1999
JP    2009094321    4/2009
(Continued)

OTHER PUBLICATIONS

XP-002732000, Aquamica—Hydrophilic Super Hard Coating, Clariant, URL:http://www.probaf.co.kr/images/service/PRO%20GUARD%20GLASS%20COATING.pdf, Retrieved on Nov. 4, 2014—the whole document.
(Continued)

*Primary Examiner* — J. Gregory Pickett
*Assistant Examiner* — Niki M Eloshway

(57) ABSTRACT

A glass container and a process for forming an inorganic silica coating on an exterior surface of the glass container to improve one or more surface characteristics of the glass container. A sol-gel solution including a polysilazane and an organic solvent is applied to the exterior surface of the glass container to form a sol-gel coating thereon. The glass container and the sol-gel coating are then exposed to a water vapor-containing environment and heated at a temperature of between 150 degrees Celsius and 600 degrees Celsius to transform the sol-gel coating into an inorganic silica coating. The as-formed silica coating has a hardness of greater than 8.5 GPa and is bonded to the exterior surface of the glass container through a plurality of siloxane bonds.

29 Claims, 1 Drawing Sheet

(51) Int. Cl.
*C03C 17/00* (2006.01)
*C03C 17/22* (2006.01)
*C03C 17/25* (2006.01)
*C03C 17/27* (2006.01)
*B65D 23/02* (2006.01)

(58) Field of Classification Search
CPC ... B65D 23/0828; C03C 17/005; C03C 17/22; C03C 17/25; C03C 17/27
USPC .......................................... 215/12.2; 427/377
See application file for complete search history.

(56) References Cited

U.S. PATENT DOCUMENTS

| | | | |
|---|---|---|---|
| 6,551,559 B1* | 4/2003 | Cates, Jr. | A61K 49/1815 215/12.2 |
| 6,767,641 B1 | 7/2004 | Shimizu et al. | |
| 7,396,568 B2 | 7/2008 | Suzuki et al. | |
| 9,034,442 B2* | 5/2015 | Chang | B65D 25/14 215/12.1 |
| 2003/0016413 A1* | 1/2003 | Carrick | H04B 10/00 398/79 |
| 2003/0164113 A1 | 9/2003 | Suzuki | |
| 2007/0011968 A1* | 1/2007 | LeBlanc | E04F 19/02 52/364 |
| 2007/0116968 A1 | 5/2007 | Dierdorf et al. | |
| 2011/0180510 A1* | 7/2011 | Julien | C03C 17/007 215/379 |
| 2011/0244153 A1 | 10/2011 | Shiozawa et al. | |
| 2012/0021177 A1* | 1/2012 | Kawai | C03C 17/42 428/148 |
| 2012/0296033 A1* | 11/2012 | Gleason | C09D 139/00 524/549 |
| 2014/0220327 A1* | 8/2014 | Adib | C03C 17/36 428/217 |
| 2014/0227507 A1* | 8/2014 | Brophy | B05C 1/003 428/312.6 |
| 2014/0263152 A1* | 9/2014 | Smith | B65D 1/023 215/47 |

FOREIGN PATENT DOCUMENTS

| | | |
|---|---|---|
| WO | 2008047886 | 4/2008 |
| WO | 2011029857 | 3/2011 |

OTHER PUBLICATIONS

PCT Int. Search Report and Written Opinion, Int. Serial No. PCT/US2014/053393, Int. Filing Date: Aug. 29, 2014, Applicant: Owens-Brockway Glass Container Inc., dated Jan. 15, 2015.

Matteo Monti, et al New Protective Coatings for Ancient Glass: Silica thin-films from perhydropolysilazane Journal of Cultural Heritage 9 (2008) e143-e145 Elsevier Masson FR.

Aquamica Hydrophilic Super Hard Coating, Clariant (Japan) K.K. Polysilazane Business Group, Bunkyo-ku Tokyo.

* cited by examiner

POLYSILAZANE-DERIVED COATING FOR GLASS CONTAINERS

The present disclosure is directed to glass containers, and, more particularly, to coatings for glass containers, e.g., glass bottles and jars.

BACKGROUND AND SUMMARY OF THE DISCLOSURE

Glass containers may be coated for a variety of different purposes, including damage prevention, e.g., scratch and abrasion resistance, and strength retention. Such coatings may be applied to the glass containers at various points in the manufacturing process. For example, glass containers are conventionally coated with metal oxides, e.g., oxides of tin, titanium, vanadium, or zirconium at the "hot end" of the annealing lehr, and then overcoated with protective organic coatings at the "cold end" of the annealing lehr. Accordingly, these conventional coatings may be referred to as cold end or hot end coatings. U.S. patents that illustrate coating processes of this type include U.S. Pat. Nos. 3,323,889; 3,407,085; 3,414,429; 3,418,154; 3,425,859; 3,445,269; 3,498,825; 3,554,787; and 3,598,632.

A general object of the present disclosure, in accordance with one aspect of the disclosure, is to provide a process for coating glass containers that can improve certain desirable surface characteristics of the glass containers.

The present disclosure embodies a number of aspects that can be implemented separately from or in combination with each other.

A process for forming an inorganic silica coating on a glass container in accordance with one aspect of the disclosure includes: (a) applying a sol-gel solution including a polysilazane and an organic solvent to an exterior surface of a glass container to form a sol-gel coating thereon, and (b) heating the glass container and the sol-gel coating in a water vapor-containing environment having a temperature between 150 degrees Celsius and 600 degrees Celsius to form an inorganic silica coating on the exterior surface of the glass container, wherein the silica coating has a hardness greater than 8.5 GPa and is bonded to the exterior surface of the glass container through a plurality of siloxane bonds.

In accordance with another aspect of the disclosure, there is provided a process for manufacturing a glass container having improved surface characteristics that includes: (a) forming a glass container, (b) applying a sol-gel solution including a polysilazane and an organic solvent to an exterior surface of the glass container to form a sol-gel coating thereon, and (c) heating the glass container and the sol-gel coating in a water vapor-containing environment having a temperature between 150 degrees Celsius and 600 degrees Celsius to form an inorganic silica coating on the exterior surface of the glass container, the silica coating having a hardness greater than 8.5 GPa and being bonded to the exterior surface of the glass container through siloxane bonds.

In accordance with yet another aspect of the disclosure, there is provided a glass container having improved surface characteristics that includes: a glass substrate that defines the shape of the container and provides the container with a closed base at an axial end of the container, a body extending axially from the base and being circumferentially closed, and an open mouth at another axial end of the glass container opposite the base; and an inorganic nonporous silica coating formed on an exterior surface of the glass substrate. The silica coating has a hardness greater than 8.5 GPa and is bonded to the exterior surface of the glass container through a plurality of siloxane bonds.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

Figure 1:
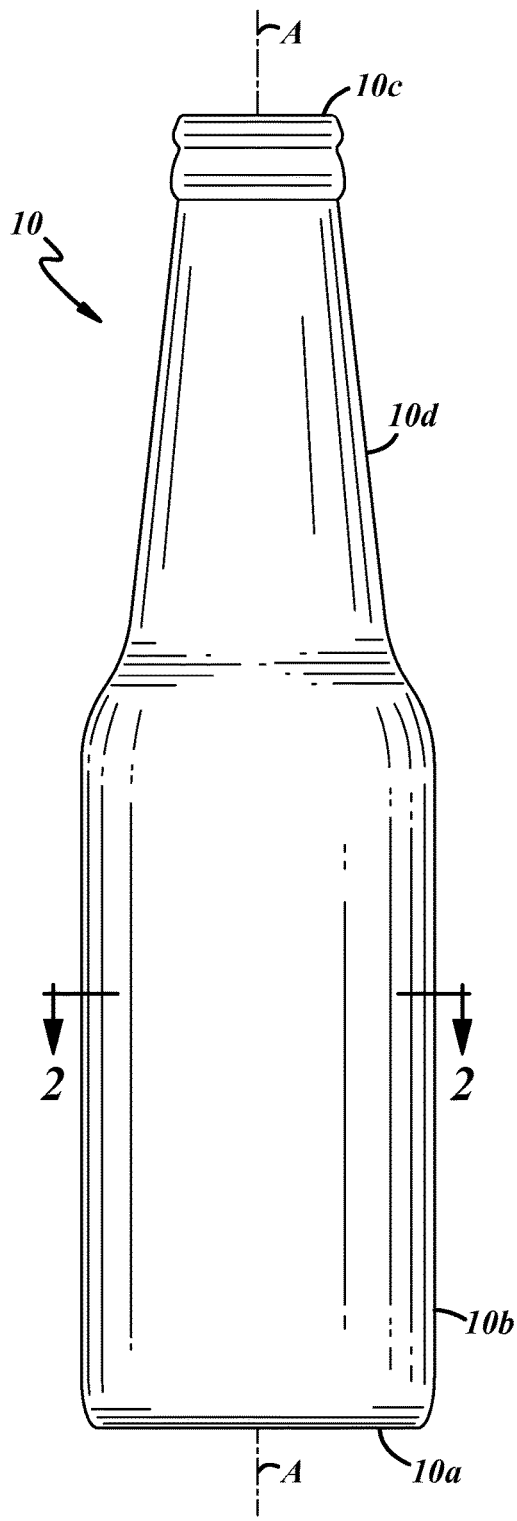
FIG. 1 is a side elevation view of a glass container, in accordance with one illustrative embodiment of the present disclosure.

FIG. 1 illustrates a glass container 10 that may be produced in accordance with one embodiment of the present disclosure. The glass container 10 includes a longitudinal axis A, a closed base 10a at one axial end of the container 10, a body 10b extending in an axial direction from the closed base 10a, and an open mouth 10c at another axial end of the container 10 opposite of the base 10a. Accordingly, the glass container 10 is hollow. In the illustrated embodiment, the container 10 also includes a neck 10d that may extend axially from the body 10b, may be generally conical in shape, and may terminate in the mouth 10c. However, the container 10 need not include the neck 10d and the mouth 10c may terminate the body 10b, such as in a glass jar embodiment or the like. The body 10b may be of any suitable shape in cross-section transverse to the axis A as long as the body 10b is circumferentially closed.

Figure 2:
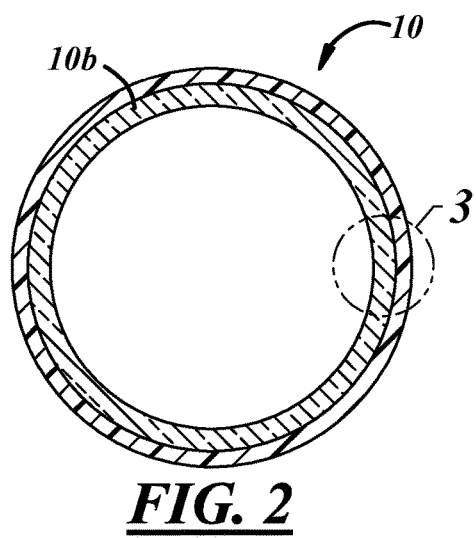
FIG. 2 is a cross-sectional view of a body portion of the glass container, taken along line 2-2 of FIG. 1.

As illustrated in FIG. 2, the body 10b may be of cylindrical transverse cross-sectional shape that is circumferentially closed. In other embodiments, the body 10b may be generally oval, square, rectangular, or of any other suitable transverse cross-sectional shape. As used herein, the term "circumferentially" applies not only to circular or cylindrical transverse cross-sectional shapes but also applies to any transverse cross-sectional shape.

Figure 3:
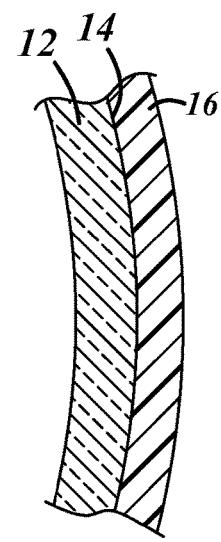
FIG. 3 is an enlarged sectional view of the body portion of the glass container, taken from circle 3 of FIG. 2.

Referring now to FIG. 3, the container 10 includes a glass substrate 12 having at least one coating layer formed on an exterior surface 14 thereof. In the embodiment illustrated in FIG. 3, an inorganic non-porous silica coating 16 is formed on the glass substrate 12. The glass substrate 12 may have a thickness in the range of 1-5 mm, and the silica coating 16 may have a thickness in the range of 0.1 μm to 1.5 μm, including all ranges and subranges between these ranges. In some specific embodiments, the silica coating 16 may have a thickness in the range of 0.5 μm to 1 μm, including all ranges and subranges therebetween.

The silica coating 16 may be formed directly on the substrate 12, or the silica coating 16 may be formed on the exterior surface 14 of the glass substrate 12 over one or more different coatings already present on the glass substrate 12. For example, the silica coating 16 may be formed on the exterior surface 14 of the glass substrate 12 over a conventional hot end coating that has been applied to the exterior surface 14 of the glass substrate 12 after formation of the substrate 12, but before the substrate 12 has been annealed. In some embodiments, the silica coating 16 may be formed directly on the exterior surface 14 of the glass substrate 12 after formation of the substrate 12, but before the substrate 12 has been annealed. In such case, the silica coating 16 may eliminate the need for a conventional hot end coating.

In addition, one or more additional coating layers may be formed over the silica coating 16 on exterior surface 14 of the glass substrate 12. For example, a conventional cold end coating may be formed on the exterior surface 14 of the glass substrate 12 over the silica coating 16 anytime after the glass substrate 12 has been annealed.

If the container 10 includes one or more different coatings overlying and/or underneath the silica coating 16 on exterior surface 14 of the glass substrate 12, the various coatings may be formed as adjacent layers overlying one another sequentially, or one or more of the coatings may penetrate into or even through one or more of the other coatings. Accordingly, the various coatings may be fairly described as being formed generally "on" or "over" the glass substrate 12, regardless of how or to what extent any given coating contacts any of the other coatings and/or the substrate 12 itself. Similarly, when a material is described as being applied generally to the glass container 10, the material may be applied directly to the glass substrate 12, or the material may be applied to the glass substrate 12 over one or more coatings already present on the glass substrate 12.

The silica coating 16 may be bonded to the glass substrate 12, or to an intermediate coating layer already present on the glass substrate 12, through siloxane bonds. In addition, the silica coating 16 may be substantially non-porous and dense, and may have a density of about 1.8 grams per cubic centimeter (g/cm$^3$). For example, the silica coating 16 may have a density in the range of 1.5 g/cm$^3$ to 2 g/cm$^3$, including all ranges and subranges therebetween.

In some embodiments, the silica coating 16 may be relatively hard and flexible, as compared to the glass substrate 12 itself, and may have a hardness in the range of 8.5 GPa to 10 GPa, including all ranges and subranges therebetween. In one specific example, the silica coating 16 may have a hardness of about 9.4 GPa. In contrast, soda-lime glass typically has a hardness of about 8.1 GPa. Accordingly, formation of the silica coating 16 on the exterior surface 14 of the glass substrate 12 may increase the abrasion and impact resistance of the glass substrate 12. In addition, the silica coating 16 may fill in one or more imperfections on the exterior surface 14 of the glass substrate 12, which may further strengthen the glass substrate 12.

The silica coating 16 also may be relatively hydrophilic, as compared to the glass substrate 12 itself, and may have a water contact angle of less than 25 degrees. For example, the silica coating 16 may have a water contact angle in the range of 10 degrees to 20 degrees, including all ranges and subranges therebetween. Accordingly formation of the silica coating 16 on the exterior surface 14 of the glass substrate 12 may increase the stain resistance of the glass container 10 while also making it easier to clean. In addition, by increasing the hydrophilicity of the exterior surface 14 of the glass substrate 12, the silica coating 16 may improve the labelability of the glass container 10.

The silica coating 16 of the present disclosure can thus contribute to the enhancement of one or more properties of the glass container 10 when the silica coating 16 is formed directly on the exterior surface 14 of the glass substrate 12, or over one or more different coatings already present on the glass substrate 12.

The glass container 10 may be produced in any suitable manner. A typical glass container manufacturing process includes a "hot end," where molten glass is prepared and formed into the shape of a glass container, and a "cold end," where the glass container is inspected, and packaged. After the glass container is formed, but before it is inspected and packaged, the glass container is annealed, for example, in an annealing lehr.

The silica coating 16 may be formed on the glass substrate 12 using a sol-gel process, which may be performed before, during, or after the glass container 10 is annealed. This may include (1) preparing a sol-gel solution that contains a silica precursor, (2) applying the sol-gel solution to the glass container 10 to form a sol-gel coating on the glass container 10, and then (3) converting the sol-gel coating into a thin film of silica ($SiO_2$).

The silica precursor used to form the silica coating 16 of the present disclosure includes a polysilazane. Suitable polysilazanes include perhydropolysilazanes, which may include chain polymers or cyclic polymers with repeating units of the following chemical formula: $[H_2Si-NH]_n$. Suitable perhydropolysilazanes also may have molecular weights in the range of 1,000 to 200,000, including all ranges and subranges therebetween.

One example of a commercially available polysilazane-containing coating material that may suitably be used as the sol-gel solution of the present disclosure is AQUAMICA™ NL110A, which is manufactured by Clariant®.

In other embodiments, a suitable sol-gel solution may be prepared by dissolving or dispersing a suitable polysilazane in an organic solvent. The dissolved or dispersed polysilazane may account for about 20 wt. % of the sol-gel solution, for example, the polysilazane may account for between 2 wt. % and 30 wt. % of the sol-gel solution, including all ranges and subranges therebetween. The sol-gel solution may be formulated to have a viscosity of less than 20 cP, for example, the sol-gel solution may have a viscosity in the range of 1-10 cP, including all ranges and subranges therebetween. Examples of organic solvents that may suitably be used to prepare the sol-gel solution include: aliphatic alcohols (e.g., methanol, ethanol, n-propanol or isopropanol), aliphatic or aromatic hydrocarbons (e.g., benzene, toluene or xylene), halogenated hydrocarbons (e.g., trichloroethylene), esters (e.g., ethyl acetate or butyl acetate), ketones (e.g., acetone or methyl ethyl ketone), ethers (e.g., tetrahydrofuran or dibutyl ether), or mixtures of these solvents.

The sol-gel solution also may include a catalyst, e.g., a palladium or amine catalyst, to help lower the temperature at which the glass container 10 and the sol-gel coating are heated to form the silica coating 16. However, the sol-gel solution may be substantially free of any additional chemicals or compounds that are intended to promote or help maintain the hydrophilicity of the silica coating 16.

The sol-gel solution may be applied to the glass container 10 before, during, or after annealing. If the sol-gel solution is applied to the glass container 10 before annealing, the glass container 10 may be at a temperature in the range of 200 degrees Celsius to 800 degrees Celsius during the application process, including all ranges and subranges therebetween. If the sol-gel solution is applied after annealing, the glass container 10 may be at a temperature in the range of 50 degrees Celsius to 250 degrees Celsius when the sol-gel solution is applied thereto, including all ranges and subranges therebetween.

The sol-gel solution may be applied to the glass container 10 by any suitable wet chemical coating method known in the art. For example, the sol-gel solution may be applied to the glass container 10 by spraying, dipping, brushing, roller coating, or flow-coating, to name a few. The sol-gel solution may be applied to the glass container 10 such that the sol-gel coating at least partially fills in one or more unintentionally formed imperfections in the glass container 10. The sol-gel solution may suitably be at room temperature or slightly above room temperature during the application process. For example, the sol-gel solution may be at a temperature in the range of 20 degrees Celsius to 35 degrees Celsius when it is applied to the glass container 10, including all ranges and subranges therebetween.

The sol-gel coating may be converted into a thin film of silica by heating the glass container 10 and the sol-gel coating in a water vapor-containing environment.

The time required to convert the sol-gel coating into silica will depend, at least in part, upon the temperature at which the glass container 10 and the sol-gel coating are heated, and upon the relative humidity of the environment in which they are heated. According to embodiments of the present disclosure, formation of the silica coating 16 may include heating the glass container 10 and the sol-gel coating at a temperature in the range of 150-600 degrees Celsius in an environment having 60-85% relative humidity for 0.5 hours to 4 hours, including all ranges and subranges between these ranges. In some specific embodiments, the silica coating 16 may be formed by heating the glass container 10 and the sol-gel coating a water vapor-containing environment having a temperature in the range of 300-600 degrees Celsius, including all ranges and subranges therebetween.

In some embodiments, the glass container 10 and the sol-gel coating may be exposed to an ammonia vapor-containing environment to help increase the rate at which the sol-gel coating is converted to silica. This may include exposing the glass container 10 and the sol-gel coating to an environment containing 10-30 wt. % ammonia for 30 minutes to 3 hours, including all ranges and subranges between these ranges. The glass container 10 and the sol-gel coating may suitably be heated at a temperature in the range of 170-200 degrees Celsius, including all ranges and subranges therebetween, while they are being exposed to the ammonia vapor-containing environment.

In some embodiments, the glass container 10 and the sol-gel coating may be heated by passing the glass container 10 through the annealing lehr. In other embodiments, the glass container 10 may be passed through a separate oven, lehr, and/or furnace located downstream of the initial annealing lehr. In yet another embodiment, where the sol-gel solution is applied to the glass container 10 after annealing, the glass container 10 and the sol-gel coating may be heated by looping the glass container 10 back through the initial annealing lehr.

There thus has been disclosed a process for coating glass containers that can improve certain desirable surface characteristics of the glass containers, that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A process for manufacturing a glass container having improved surface characteristics that includes:
   (a) forming a glass container,
   (b) applying a conventional hot end coating to an exterior surface of said glass container, wherein said hot end coating comprises an oxide of tin, titanium, vanadium, or zirconium;
   (c) applying a sol-gel solution including an inorganic polysilazane and a solvent onto said exterior surface of said glass container over said hot end coating to form a sol-gel coating thereon; and
   (d) heating said glass container and said sol-gel coating in a water vapor-containing environment having a temperature between 150 degrees Celsius and 600 degrees Celsius to form an inorganic silica coating on said exterior surface of said glass container, said silica coating having a hardness greater than 8.5 GPa and being bonded to said exterior surface of said glass container through siloxane bonds.

2. The process set forth in claim 1 that also includes:
   before said step (c), annealing said glass container.

3. The process set forth in claim 2 wherein said exterior surface of said glass container has a temperature in the range of 50 degrees Celsius to 250 degrees Celsius when said sol-gel solution is applied thereto in said step (c).

4. The process set forth in claim 1 wherein said step (c) is performed before said glass container is annealed.

5. The process set forth in claim 4 wherein said exterior surface of said glass container has a temperature in the range of 200 degrees Celsius to 800 degrees Celsius when said sol-gel solution is applied thereto in said step (c).

6. The process set forth in claim 1 that also includes:
   after said step (d), applying a conventional organic cold end coating to said exterior surface of said glass container.

7. The process set forth in claim 1 that also includes:
   after said step (c), exposing said glass container and said sol-gel coating to an ammonia vapor-containing environment.

8. The process set forth in claim 1 wherein said inorganic silica coating has a thickness in the range of 0.1-1.5 μm.

9. The glass container set forth in claim 1 wherein said inorganic silica coating has a density in the range of 1.5 g/cm3 to 2 g/cm3.

10. The glass container set forth in claim 1 wherein said inorganic silica coating has a water contact angle of less than 25 degrees, and wherein formation of the inorganic silica coating on the exterior surface of the glass container increases the hydrophilicity of the exterior surface of the glass container.

11. The process set forth in claim 1 wherein the sol-gel solution applied to the exterior surface of the glass container in step (c) has a viscosity of less than 20 cP.

12. The process set forth in claim 1 wherein the inorganic silica coating formed on the exterior surface of the glass container in step (d) is nonporous.

13. The process set forth in claim 1 that also includes:
   after said step (b), exposing said glass container and said sol-gel coating to an ammonia vapor-containing environment.

14. The process set forth in claim 1 wherein the sol-gel solution applied to the exterior surface of the glass container in step (b) has a viscosity of less than 20 cP.

15. The process set forth in claim 1 wherein the inorganic silica coating formed on the exterior surface of the glass container in step (c) is nonporous.

16. A glass container having improved surface characteristics that includes:
   a glass substrate that defines the shape of said container and provides said container with a closed base at an axial end of said container, a body extending axially from said base and being circumferentially closed, and an open mouth at another axial end of said glass container opposite said base;
an inorganic non-porous silica coating formed on an exterior surface of said glass substrate, said silica coating having a hardness greater than 8.5 GPa and being bonded to said exterior surface of said glass container through a plurality of siloxane bonds; and
a conventional organic cold end coating over said exterior surface of said glass substrate over said silica coating.

17. The glass container set forth in claim 16 wherein said silica coating is derived from an inorganic polysilazane-containing sol-gel solution.

18. The glass container set forth in claim 16 wherein said polysilazane-containing sol-gel solution includes 2 wt % to 30 wt % perhydropolysilazane.

19. The glass container set forth in claim 16 wherein said silica coating has a thickness in the range of 0.1-1.5 μm.

20. The glass container set forth in claim 16 wherein said silica coating has a density in the range of 1.5 g/cm3 to 2 g/cm3.

21. The glass container set forth in claim 16 wherein said silica coating has a water contact angle of less than 25 degrees.

22. The glass container set forth in claim 16 that does not include:
a conventional hot end coating on said exterior surface of said glass substrate.

23. The glass container set forth in claim 16 wherein said inorganic non-porous silica coating is formed as a single layer.

24. A process for manufacturing a glass container having improved surface characteristics that includes:
(a) forming a glass container,
(b) applying a sol-gel solution including an inorganic polysilazane and a solvent onto an exterior surface of said glass container to form a sol-gel coating thereon;
(c) heating said glass container and said sol-gel coating in a water vapor-containing environment having a temperature between 150 degrees Celsius and 600 degrees Celsius to form an inorganic silica coating on said exterior surface of said glass container, said silica coating having a hardness greater than 8.5 GPa and being bonded to said exterior surface of said glass container through siloxane bonds; and then
(d) applying a conventional organic cold end coating to said exterior surface of said glass container over said inorganic silica coating.

25. The process set forth in claim 24 that also includes: before said step (b), annealing said glass container.

26. The process set forth in claim 25 wherein said exterior surface of said glass container has a temperature in the range of 50 degrees Celsius to 250 degrees Celsius when said sol-gel solution is applied thereto in said step (b).

27. The process set forth in claim 24 wherein said step (b) is performed before said glass container is annealed.

28. The process set forth in claim 27 wherein said exterior surface of said glass container has a temperature in the range of 200 degrees Celsius to 800 degrees Celsius when said sol-gel solution is applied thereto in said step (b).

29. The process set forth in claim 24 that does not include:
applying a conventional hot end coating onto said exterior surface of said glass container.

\* \* \* \* \*